A. C. VAN HOUWELING.
SIDE CONVEYER FOR BAND CUTTERS AND FEEDERS.
APPLICATION FILED MAY 1, 1911.

1,076,533.

Patented Oct. 21, 1913.
3 SHEETS—SHEET 1.

Fig. 1

Witnesses
A. G. Hague.
W. A. Loftus.

Inventor
Arthur C. Van Houweling.
by J. Ralph Dwight

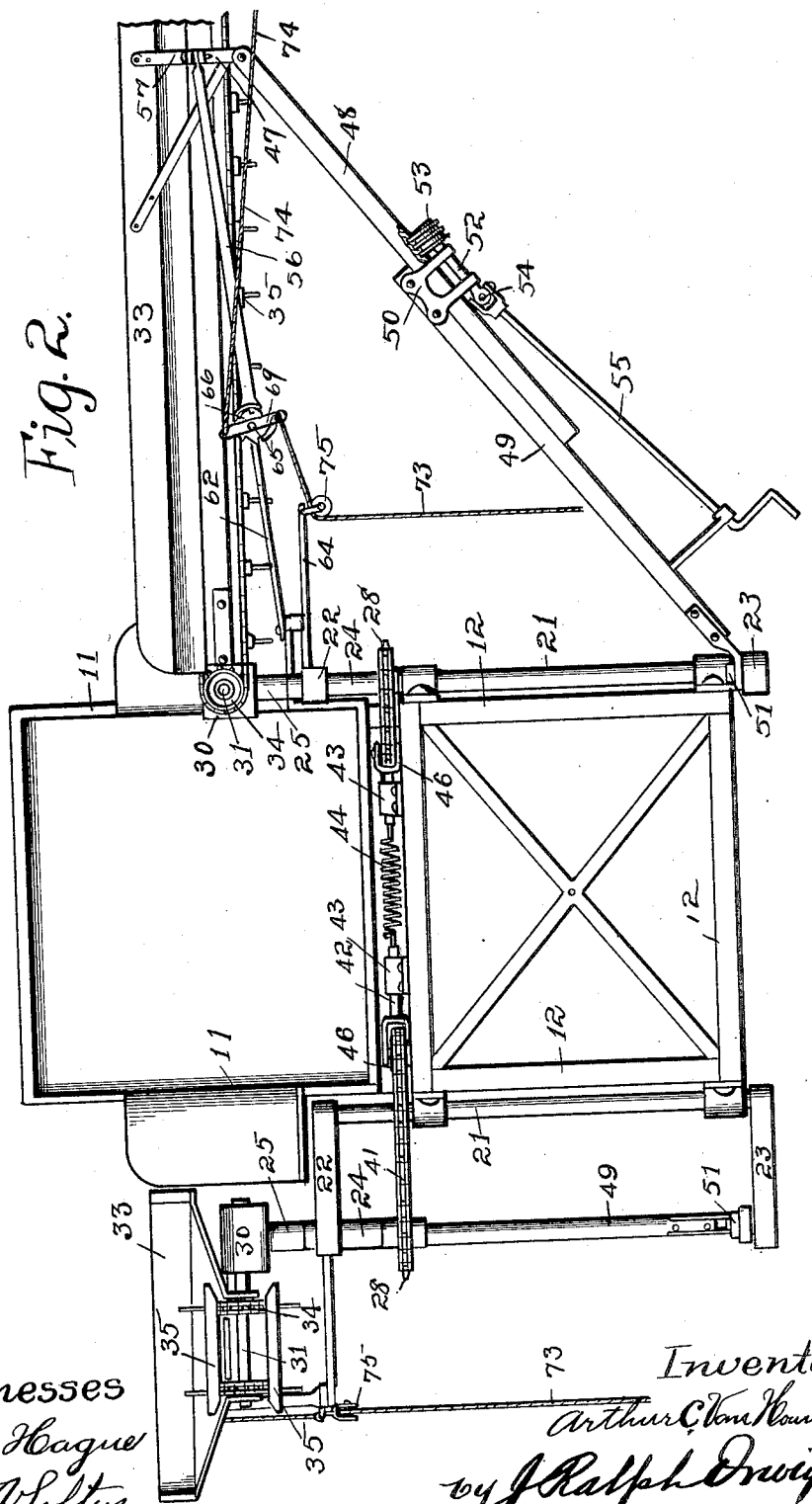

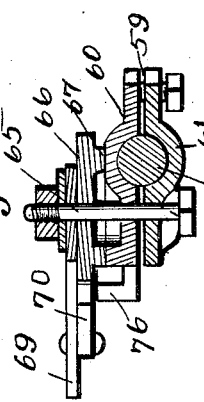

UNITED STATES PATENT OFFICE.

ARTHUR C. VAN HOUWELING, OF PELLA, IOWA.

SIDE CONVEYER FOR BAND-CUTTERS AND FEEDERS.

1,076,533.  Specification of Letters Patent.  Patented Oct. 21, 1913.

Application filed May 1, 1911. Serial No. 624,297.

*To all whom it may concern:*

Be it known that I, ARTHUR C. VAN HOUWELING, a citizen of the United States, residing at Pella, in the county of Marion and State of Iowa, have invented certain new and useful Side Conveyers for Band-Cutters and Feeders, of which the following is a specification.

The object of my invention is to provide a device of the class described in which the side conveyers are permanently secured to the frame of the band cutter and feeder and to the end of a threshing machine to which the band cutter and feeder is attached and which are so arranged that they may be readily and easily swung to a position extended parallel with the sides of the threshing machine where they may be conveniently and easily supported and carried.

A further object is to provide means for supporting the outer ends of the side conveyers in such a manner that they may freely swing in a horizontal plane through approximately a half circle and at the same time swing freely and evenly through any part of their movement without having a tendency to swing below the horizontal plane in which they are placed at any point of said movement.

A further object is to provide improved means by which an operator, at a point adjacent to the outer end of the side conveyer, or an operator standing on the ground at the end of the threshing machine, may conveniently and easily, and by means of a single rope either firmly secure the side conveyer against movement in a horizontal plane or release it so that it may be easily swung in a horizontal plane.

A further object is to provide improved means for raising and lowering the side conveyers so that their outer ends may be placed at any desired point of elevation.

A further object is to provide improved means for bracing the supports for the side conveyers to make them firm and rigid and to prevent vibration.

A further object is to provide improved means for driving the conveyer chains of the side conveyers and to automatically adjust said mechanism for successful operation when the side conveyers are in any position of their adjustment.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a perspective view of a portion of a threshing machine, a band cutter and feeder thereon, and my improved side conveyers applied thereto. Fig. 2 shows a rear elevation of the frame of the band cutter and feeder with my improved side conveyers applied thereto, one being shown extended at right angles to the side of the band cutter and feeder and the other being shown in position parallel with the band cutter and feeder. Fig. 3 shows an enlarged, detail, side view of the gripping device for the rod that prevents lateral movement of the side conveyers. Fig. 4 shows a side elevation of same. Fig. 5 shows a detail, sectional view on the line 5—5 of Fig. 3. Fig. 6 shows a detail, perspective view of the ratchet wheel forming part of said gripping device. Fig. 7 shows a detail, plan view illustrating the means for taking up slack in the sprocket chains that drive the chains of the lateral conveyers. The dotted lines in said figure show the supporting arm for one of the side conveyers in an adjusted position, and Fig. 8 shows an enlarged, detail, sectional view illustrating the means for transmitting power from the sprocket chains, shown in Fig. 7, to the driving shaft of the chains on one of the side conveyers.

Referring to the accompanying drawings, I have used the reference numeral 10 to indicate that portion of the threshing machine shown and 11 the frame of the band cutter and feeder. Both of these devices are of the ordinary construction and of themselves form no part of my present invention.

My improved supporting means for the side conveyers comprises a substantially rectangular frame 12 fixed to the sides of the band cutter and feeder at its upper end and having at its lower end two braces 13 fixed thereto and connected to the lower portion of the threshing machine frame. Two supporting rods 14 are also fixed to the lower corners of the frame 12 and extend upwardly and toward the threshing machine to which they are attached in any suitable manner. These rods are preferably provided with turn-buckles 15 whereby the frame 12 may be adjusted to stand in an upright position.

In order to provide for firmly bracing the frame 12 when the machine is in use, I have provided a lever 16 pivoted to one of the rods 13 and pivotally connected below its fulcrum with a rod 17. This rod 17 is telescopically connected with a base 18 and a set screw 19 is provided for connecting the parts 17 and 18. A lug 20 is provided on the frame 12 for limiting the movement of said lever 16. In using this portion of the device, and assuming that it is desired to fix the frame 12 firmly in position the lever 16 is moved to a substantially horizontal position and then the base 18 is placed resting on the ground and the set screw 19 is tightened. After this is done the lever 16 is moved to the position shown in Fig. 1 where it will engage the lug 20 and thus pass a dead center line through the rod 17. During the upward movement of the lever 16 the frame 12 will be slightly raised and the base 18 will be firmly positioned on its support and all vibration or movement of the frame 12 will be thereby prevented.

The two side conveyers are of the same construction and they operate in the same manner. Hence one of said side conveyers only will be hereinafter described in detail.

Mounted on the side of the frame 12 is an upright shaft 21 having an arm 22 at its upper end extended horizontally, and an arm 23 at its lower end parallel with the arm 22. Formed on the outer end of the arm 22 is a vertically arranged tubular bearing 24 and within this bearing is a sleeve 25 rotatably mounted and held against downward movement by an annular rib 26 which engages the top of the bearing 24, as shown in Fig. 8. Within the sleeve 25 is a shaft 27 having on its lower end a sprocket 28 and on its upper end a beveled pinion 29. Formed on the top of the sleeve 25 is an inclosed casing 30 and mounted within this casing is a horizontally arranged shaft 31 having a beveled pinion 32 thereon in mesh with the pinion 29.

The frame of the side delivery conveyer is indicated generally by the reference symbol 33 and this frame is pivotally supported on the shaft 31, as shown at the left in Fig. 2. The shaft 31 is also provided with sprocket wheels 34 and a sprocket chain conveyer device 35 is passed around said wheel. Any ordinary construction for the conveyer frame and for the sprocket chain conveyer device may be used.

In order to provide for driving the sprocket wheels 28 of both side conveyers when the side conveyers are in any position of their adjustment, I have provided the following mechanism: On the band cutter and feeder is a transverse shaft 36, shown in Fig. 1. On each end of the shaft 36 is a beveled pinion 37, one only being shown in Fig. 1. Arranged at the side of the band cutter and feeder frame is an upright shaft 38 having thereon a beveled pinion 39 and a sprocket wheel 40, the pinion 37 being in mesh with the pinion 39. A sprocket chain 41 is passed around the sprocket wheels 40 and 28. I have provided means for keeping this chain 41 tightly stretched around said sprocket wheels 40 and 28, when the latter are in different positions of their adjustment as follows: Referring to Fig. 7 of the drawings, I provide two sliding shafts 42 mounted in bearings 43 in the top of the frame 12. The inner ends of these shafts are connected by means of a contractible coil spring 44; on the outer end of each shaft is a fork 45 having a sprocket wheel 46 mounted therein, the chain 41 being passed around the sprocket wheel 46 and through the fork 45. In this way the slack in either one of the chains 41 is automatically taken up.

In order to provide for raising and lowering the outer ends of the side conveyers, I have provided near the outer end of each conveyer frame a brace 47 to which is pivoted the upper member 48 of an adjustable supporting leg. This member is provided with worm gear teeth on one side, as shown in Fig. 2. The other adjustable leg member is indicated by the numeral 49 and is provided with a bracket 50 to slidingly receive the part 48. The lower end of the part 49 is pivotally connected by means of a bolt 51 with the arm 23 at a point directly in line with the shaft 27. Mounted in the bracket 50 is a short shaft 52 having on one end a worm gear 53 in mesh with the gear teeth on the member 48 and having on its other end a universal joint 54 to which is connected a crank shaft 55. Obviously by turning the crank shaft 55 in one direction the adjustable leg may be extended and the outer end of the side conveyer raised and by turning the crank in the opposite direction the adjustable leg will be contracted and the outer end of the side conveyer lowered. By having the lower end of the adjustable leg pivoted at a point exactly in line with the pivotal point of the inner end of the said conveyer, it is obvious that the side conveyer may be swung throughout a complete half circle the entire limit of its movement and the outer end thereof may be maintained in the same horizontal plane.

In machines of this class heretofore, the supports for the outer ends of the said conveyers have been placed at points that were not in line with the pivotal points of the side conveyers and where this construction is used, the side conveyer frame can swing only a short distance to either side of the point where the adjustable leg is resting because when moved beyond a certain slight limit the lower end of the supporting leg will not be in line directly below the side conveyer frame and hence the side conveyer frame will have a tendency to move downwardly and away from the point where the adjustable leg is supported. However by my improved construction the lower end of the supporting leg is always directly in line below the side conveyer frame and therefore the outer end of the side conveyer frame may swing throughout its entire limit of movement in the same horizontal plane.

I have provided improved means for firmly supporting the side conveyer frame against movement in a horizontal direction or for permitting said movement, and I have provided means whereby this device may be secured or released by an operator either at the outer end of the side conveyer, or by an operator on the ground by pulling upon a single rope either to release or secure. This device comprises a tube 56 having its outer end pivotally connected to the side conveyer frame by means of a bracket 57. Fixed to the end of this tube 56 is a socket 58 having its sides slotted at 59. This socket is provided with two disk-shaped portions 60 and 61 and said disk-shaped portions and socket are designed to slidingly receive a rod 62. This rod 62 has one end pivotally connected at 63 to a bracket 64, which bracket is extended laterally from the frame of the band cutter and feeder, as shown in Figs. 1 and 7, so that said rod extends at an angle different from that at which the side conveyer frame is extended. It is obvious that so long as the rod 62 may slide freely relative to the tube 56 the side conveyer frame may freely swing in a horizontal plane and that when said rod 62 and tube 56 are gripped together the lateral movements of the conveyer frame will be prevented. Extended through the disks 60 and 61 is a bolt 65 having rotatably mounted thereon a ratchet wheel 66. This sprocket wheel is provided on one side with a series of lugs 67 spaced apart from each other and clearly illustrated in Figs. 5 and 6. The top surface of the plate 60 is provided, as shown in Fig. 4, with a series of notches 68 to coact with the lugs 67. A lever 69 is fulcrumed to the bolt 65 and it carries a pawl 70 to engage the ratchet wheel 66. This pawl is connected to a contractible coil spring 71 which has its other end attached to a support 72 on the tube 56, as shown in Fig. 3. On each end of the lever 69 is a rope, one being indicated by the numeral 73 and the other by the numeral 74. The first is extended over a pulley 75 to a point accessible to an operator standing on the ground and the other is extended adjacent to the conveyer frame to a point near the outer end thereof to be accessible to an operator at the outer end of the conveyer frame. When either of the ropes is pulled upon the pawl 70 will engage the ratchet wheel 66 and move it one tooth space until it is stopped by reason of the lever 69 striking the upwardly projecting guard member 76 on the socket 58. This will cause the ratchet wheel to move far enough to bring the lugs 67, without the notches 68, to the position shown in Fig. 4. The next movement of said lever will be sufficient to bring the lugs 67 into the notches 68. The springs 71 will always return the lever 69 to the position shown in Fig. 3 and it will also hold the pawl 70 in engagement with the ratchet wheel. When the lugs 67 are out of the notches 68, as shown in Fig. 4, the two disks 60 and 61 will be firmly held together and longitudinal movement of the rod 62 will be prevented and when the lugs 67 are in the notches 68 the disks 60 and 61 may move apart and the rod 62 may freely slide within the tube 56 in the socket 58. Therefore an operator may, by pulling either of the ropes 73 or 74, first clamp the rod 62 and then by another pull release it so that the side conveyer frame may be firmly fixed in any position of its adjustment or quickly released to be swung to any desired position.

In practical use, by means of the arms 22, it is obvious that the inner ends of the side conveyer frames may extend over the sides of the band cutter and feeder to deliver the material to the conveyer of the band cutter and feeder. It is also obvious that when the side conveyer frames are moved to position adjacent to the sides of the threshing machine, the delivery ends of the side conveyer frames will stand spaced apart from the band cutter and feeder conveyer frame enough to permit the side conveyer frames to lie parallel with the sides of the threshing machine. This is of material advantage in transporting machines from place to place. It is obvious however that by means of my improved mechanism for transmitting motion to the upright shafts 27, the conveyers of the side conveyer frames may be driven readily when the side conveyer frames are in any position of their horizontal movement. Furthermore the frame 12 may be firmly and securely braced to prevent swaying or vibration of the supports for the side conveyer frames.

By having the arms 23 arranged parallel with the arms 22, and fixed to swing in unison with the arms 22, and by having the adjustable supporting legs fixed to the arms 23 in line with the shaft 27, I provide for permitting the outer ends of the side conveyer frames to freely swing in a horizontal plane throughout their entire movement.

Another important feature of my invention is the means for securing the side conveyer frames against horizontal swinging movement and for releasing them so that they may freely swing. This mechanism is of extremely simple and inexpensive construction and is easily operated.

I claim as my invention:

1. In a device of the class described, the combination of a main frame, an upright shaft pivoted thereto, two arms extended laterally from said shaft and parallel with each other, a conveyer frame pivotally mounted on the upper arm, and a supporting leg pivotally mounted on the lower arm, said supporting leg being extended outwardly and upwardly and attached to the conveyer frame.

2. In a device of the class described, the combination of a threshing machine frame, a feeder frame, a supporting frame arranged beneath the feeder frame, braces extending from the lower end thereof to the threshing machine frame, braces extended from the upper portion of the threshing machine frame downwardly and toward the lower end of said supporting frame and being fixed thereto, the upper end of said supporting frame being attached to the feeder frame, a shaft mounted in said supporting frame and having two laterally extended arms parallel with each other, a conveyer frame mounted on the upper arm, and a supporting leg mounted on the lower arm and fixed to the conveyer frame.

3. In a device of the class described, the combination of a threshing machine frame, a feeder frame, a supporting frame arranged beneath the feeder frame, braces extending from the lower end thereof to the threshing machine frame, braces extended from the upper portion of the threshing machine frame downwardly and toward the lower end of said supporting frame and being fixed thereto, the upper end of said supporting frame being attached to the feeder frame, a shaft mounted in said supporting frame and having two laterally extended arms parallel with each other, a conveyer frame mounted on the upper arm, a supporting leg mounted on the lower arm, and fixed to the conveyer frame, and an adjustable supporting member carried by said supporting frame and designed to rest upon and engage the ground.

4. In a device of the class described, the combination of a threshing machine frame, a feeder frame, a supporting frame arranged beneath the feeder frame, braces extending from the lower end thereof to the threshing machine frame, braces extended from the upper portion of the threshing machine frame downwardly and toward the lower end of said supporting frame and being fixed thereto, the upper end of said supporting frame being attached to the feeder frame, a shaft mounted in said supporting frame and having two laterally extended arms parallel with each other, a conveyer frame mounted on the upper arm, a supporting leg mounted on the lower arm and fixed to the conveyer frame, a lever pivotally connected to the supporting frame, a rod pivoted to the lower end of the lever, a tubular standard slidingly connected with the rod, and means for clamping the rod within the tubular standard, for the purposes stated.

5. In a device of the class described, the combination of a main frame, an upright shaft pivoted thereto, a laterally extended arm on said shaft, a bearing formed in the outer end of the arm, a sleeve rotatably mounted within said bearing, a shaft rotatably mounted within the sleeve, a sprocket wheel on the lower end of the shaft, a pinion on the upper end of the shaft, a horizontally arranged shaft on the upper end of the said sleeve, a pinion thereon in mesh with the aforesaid pinion, a conveyer frame, a conveyer therein, means for driving the conveyer from said horizontally arranged shaft, an upright shaft on said main frame, a sprocket thereon, a chain on said sprocket, and means for taking up the slack in said chain.

6. In a device of the class described, the combination of a frame, a vertically arranged shaft pivoted to the frame, an arm extended laterally from said shaft, a vertically arranged shaft in said arm, a sprocket wheel thereon, a sprocket chain passed around said sprocket wheel, a sprocket wheel connected to the main frame and having said sprocket chain passed around it, means for driving the latter sprocket wheel, and a contractible coil spring, a sprocket wheel carried thereby and in engagement with said sprocket chain for taking up the slack in the sprocket chain when the said arm is in any position of its horizontal movement.

7. In a device of the class described, the combination of a main frame, two vertically arranged shafts on opposite sides thereof, each having a laterally extended arm, an upright shaft in the outer end of each arm, a sprocket wheel on each of said shafts, a sprocket chain passed around each sprocket wheel, two sprocket wheels at the sides of the main frame and each having one of said sprocket chains passed around it, means for driving the latter sprocket wheels, a contractible coil spring, two shafts fixed to the ends of said spring, a fork at the outer end of each shaft, and a sprocket wheel carried by each fork, said sprocket wheels being in engagement with the said sprocket chains, for the purposes stated.

Des Moines, Iowa, April 7, 1911.

ARTHUR C. VAN HOUWELING.

Witnesses:
J. S. JELSMER,
ALICE THOMASSEN.